US011951542B2

(12) United States Patent
Killian et al.

(10) Patent No.: US 11,951,542 B2
(45) Date of Patent: Apr. 9, 2024

(54) COLD SPRAY ADDITIVE MANUFACTURING OF MULTI-MATERIAL ELECTRICAL CONTACTS

(71) Applicant: Eaton Intelligent Power Limited, Dublin (IE)

(72) Inventors: Michael Lee Killian, Troy, MI (US); Jacob A. Kallivayalil, Bloomfield Township, MI (US); Yong Liu, Horseheads, NY (US); Darron Robert Mohr, Painted Post, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 150 days.

(21) Appl. No.: 17/223,120

(22) Filed: Apr. 6, 2021

(65) Prior Publication Data
US 2022/0314322 A1 Oct. 6, 2022

(51) Int. Cl.
*B22F 10/25* (2021.01)
*B22F 12/58* (2021.01)
(Continued)

(52) U.S. Cl.
CPC .............. *B22F 10/25* (2021.01); *B22F 12/58* (2021.01); *B33Y 10/00* (2014.12); *B33Y 40/10* (2020.01);
(Continued)

(58) Field of Classification Search
CPC ...... B22F 10/25; B22F 12/58; B22F 2304/10; B33Y 10/00; B33Y 40/10; B33Y 80/00; H01R 4/58; H01R 43/16
See application file for complete search history.

(56) References Cited

U.S. PATENT DOCUMENTS 5,302,414 A * 4/1994 Alkhimov ............. B05B 7/1486
427/195
6,139,913 A * 10/2000 Van Steenkiste ....... C23C 4/129
427/195
(Continued)

FOREIGN PATENT DOCUMENTS

EP      1 942 209 A1 * 7/2008
EP      3 696 296 A1    8/2008
JP      2006-177697 A * 7/2006

OTHER PUBLICATIONS

Baker, Alexander A. et al., "Cold Spray Deposition of Thermoelectric Materials", JOM, vol. 72, No. 8, 2020, 2020 The Minerals, Metals & Materials Society.
(Continued)

*Primary Examiner* — Peter Dungba Vo
*Assistant Examiner* — Jose K Abraham
(74) *Attorney, Agent, or Firm* — Eckert Seamans Cherin & Mellott, LLC

(57) ABSTRACT

The presently disclosed subject matter relates to multi-material electrical contacts, and methods of making multi-material electrical contact comprising a functionally graded monolithic structure, having a first metal and a second metal, an amount of the second metal as compared to an amount of the first metal increases with distance in the structure from a first surface to a second opposing surface of the structure such that the second metal content increases continuously or incrementally throughout the height of the electrical contact.

17 Claims, 11 Drawing Sheets

(51) Int. Cl.
    *B33Y 10/00*     (2015.01)
    *B33Y 40/10*     (2020.01)
    *B33Y 80/00*     (2015.01)
    *H01R 4/58*     (2006.01)
    *H01R 43/16*     (2006.01)

(52) U.S. Cl.
    CPC ............... *B33Y 80/00* (2014.12); *H01R 4/58* (2013.01); *H01R 43/16* (2013.01); *B22F 2304/10* (2013.01)

(56) References Cited

U.S. PATENT DOCUMENTS

| | | | | |
|---|---|---|---|---|
| 6,685,988 | B2* | 2/2004 | Van Steenkiste | H01R 4/58 427/427 |
| 7,001,671 | B2* | 2/2006 | Van Steenkiste | H01R 4/58 428/614 |
| 7,758,916 | B2* | 7/2010 | Schmid | B23K 35/3006 427/427 |
| 7,820,238 | B2* | 10/2010 | DeBiccari | C23C 24/04 427/190 |
| 8,349,396 | B2* | 1/2013 | DeBiccari | C23C 28/022 427/205 |
| 8,486,496 | B2* | 7/2013 | Ko | B05B 7/205 427/427 |
| 8,893,954 | B2 | 11/2014 | Schultz et al. | |
| 10,254,499 | B1* | 4/2019 | Cohen | B29C 64/321 |
| 2003/0077952 | A1* | 4/2003 | Steenkiste | H01R 13/03 427/180 |
| 2004/0072008 | A1* | 4/2004 | Steenkiste | H01R 4/58 428/209 |
| 2004/0157000 | A1* | 8/2004 | Steenkiste | C23C 24/04 427/446 |
| 2005/0025897 | A1* | 2/2005 | Van Steenkiste | C23C 24/04 427/446 |
| 2007/0158834 | A1* | 7/2007 | Schultz | H01L 23/49866 257/E23.068 |
| 2009/0120539 | A1* | 5/2009 | Ko | C23C 24/04 148/513 |
| 2010/0151124 | A1* | 6/2010 | Xue | C23C 4/12 239/398 |
| 2014/0227551 | A1* | 8/2014 | Rateiczak | C23C 4/06 427/455 |
| 2017/0287685 | A1* | 10/2017 | Ferrasse | C23C 24/106 |
| 2018/0174769 | A1* | 6/2018 | Ajdelsztajn | H01H 1/021 |

OTHER PUBLICATIONS

C.-J Li et al.: "Effect of Spray Angle on Deposition Characteristics in Cold Spraying", Thermal spray 2003: Advancing the Science and Applying the Technology; Proceedings of the 2003 International Thermal Spray Conference, May 5-8, 2003, Orlando, Florida, USA; [ITSC 2003], May 1, 2003 (May 1, 2003), pp. 91-96, Retrieved from the Internet: URL: http://www.plasma.eo.jp/en/deve/pdf/ Effect of Spray Angle on Deposition Characteristics in Cold Spraying. pdf, 6 pp.

European Patent Office "Invitation to Pay Additional Fees and, Where Applicable, Protest Fee (Form PCT/ISA/206) and Annex to Form PCT/ISA/206: Communication Relating to the Results of the Partial International Search" for corresponding Int'l. Appl. No. PCT/IB2022/054570, dated Aug. 25, 2022, 17 pp.

\* cited by examiner

COLD SPRAY ADDITIVE MANUFACTURING OF MULTI-MATERIAL ELECTRICAL CONTACTS

TECHNICAL FIELD

The present invention generally relates to multi-material electrical contacts and methods of making electrical contacts.

BACKGROUND

Electrical contacts are electrical circuit components found in electrical switches, relays, connectors and circuit breakers. Electrical contacts are made of electrically conductive material, typically metal. When a pair of contacts touch, they can pass an electrical current with a certain contact resistance, dependent on surface structure, surface chemistry and contact time. The surfaces where contacts touch usually are composed of metals that have a high electrical conductivity, wear resistance, oxidation resistance and other properties.

Electrical contacts can be made of one, or several different, materials. Most electrical contacts are produced by means of metal powder sintering. High conductivity metals such as silver or copper are usually blended with metals that demonstrate the ability to withstand severe electrical and mechanical forces. Depending on the required composition, one of three processes is generally employed to make electrical contacts. The Press-Sinter-Infiltrate (PSI) generally provides the highest density material, while the Press-Sinter-Repress (PSR) process is required for certain compositions. In some cases, a Press-Sinter (PS) only process is appropriate. The sintering process is preceded by compacting the metal powder in a die and applying pressure. The compact is then subjected to sintering, a process involving applying heat to a powder compact. Sintering typically takes place in a single, elongated furnace with different temperature zones. The compact is heated to below the melting point of the base metal, held at the sintering temperature, and then cooled. Sintering transforms the compacted mechanical bonds between the powder particles into metallurgical bonds, imparting strength and structural integrity to the contact, and creating a "refractory skeleton" that can be infiltrated or repressed. The atoms in the compacted materials diffuse across the boundaries of the particles, fusing the particles together and creating one solid piece. Sintering provides the electrical contact's primary metallurgical properties. After sintering, secondary heat processes are often used to enhance mechanical properties and dimensional precision. Disadvantageously, three time-consuming vacuum sintering runs are required to obtain a sintered powder disk having a sufficiently high quality and sufficiently low porosity to produce an effective electrical contact. Additionally, the sintered contact has to undergo extensive machining in order to produce contacts having specific configuration requirements. The overall metal powder sintering process can take from six to ten days time.

It would be desirable to provide an improved process for making electrical contacts. Further, it would be desirable for such a process to take less time than metal powder sintering. Additionally, it would be desirable to provide an improved process that can produce a more economical gradient composition.

SUMMARY

The present disclosure provides multi-material electrical contacts, and methods of making multi-material electrical contacts.

A first aspect of the disclosure provides a method of forming an electrical contact, the method including: operating at least one material feeder to release a feed of a first metal and a second metal, wherein the first and second metals are each in solid state and powder form; depositing the first metal and second metal on a substrate by applying a compressed gas to the metals to eject the metals toward the substrate, wherein the depositing is performed under a pressure sufficient to form a solid state bond between the first and second metals to yield a material column, while maintaining the material column at a temperature that is below the melting temperature of both the first and second metals, thereby yielding an electrical contact. In some embodiments, the depositing further includes varying relative amounts of the first and second metals as the deposited metals build up on the material column to cause the material column to be a functionally graded material column. In some embodiments, the method further includes combining the first and second metals by mixing and placing the combined metals in the same material feeder. In some embodiments, the at least one material feeder includes a first material feeder and a second material feeder; the first material feeder is operated to release the feed of the first metal, and the second material feeder is operated to release the feed of the second metal; and the first and second metals are mixed when the metals, each still in a solid state, are ejected by applying the compressed gas. In some embodiments, the compressed gas is a primary gas selected from the group of helium, nitrogen, compressed air, hydrogen, or a combination thereof. In some embodiments, the method is conducted in a cold spray additive manufacturing device. In some embodiments, the released metals are ejected toward the substrate through a cold spray system nozzle. In some embodiments, the at least one material feeder is located upstream of the cold spray system nozzle. In some embodiments, the at least one material feeder releases at least one of the first or second metals into the cold spray system nozzle. In some embodiments, the pressure under which the released first and second metals are ejected toward the substrate is controlled by the location of the at least one material feeder on the cold spray additive manufacturing device. In some embodiments, the first and second metals each have a particle size of from 5 microns to 120 microns. In some embodiments, the first and second metals are ejected onto the substrate at an angle of from 75° to 105°. In some embodiments, at least one of the following is varied at least once during the method: a ratio of a volume or weight of the first metal to a volume or weight of second metals; a ratio of average or mean particle size of the first metal to average or mean particle size of the second metal; or a type of the first metal or of the second metal. In some embodiments, a composition of the first metal, the second metal, or both in the material feeder is changed at least once during the method. In some embodiments, a composition of the metal in the at least one material feeder is controlled by a computer program. In some embodiments, the electrical contact is formed within a period of time of between 2 minutes and 25 minutes. In some embodiments, the first solid state metal has an electrical conductivity of at least 25 millisiemens per meter (mS/m). In some embodiments, the first solid state metal includes a matrix metal selected from the group of copper, silver, aluminum, gold, platinum, or a combination thereof, and the second solid state metal is an arc resistance particle. In some embodiments, the second solid state metal comprises one or more constituents selected from the group of chromium, chromium carbide, tungsten, tungsten carbide, molybdenum, molybdenum carbide, vanadium, vanadium carbide, aluminum oxide, or a combination thereof. In some embodiments, the first and second metals have melting temperatures that differ by at least 1400° F.

A second aspect of the disclosure provides a method of forming an electrical contact, the method including: operating a material feeder on a friction stir additive device to release a feed of a first solid state metal and a second solid state metal onto a substrate, yielding a material column, wherein the material feeder includes a receiver defined by a rotatable shoulder, and wherein operating the material feeder on the friction stir additive device to release the feed of the first and second metals onto a substrate includes: applying pressure to the first and second metals in the receiver, and rotating the material feeder shoulder around the first and second metals, to form a solid state bond between the released metals, and releasing the metals onto the substrate while maintaining the material column at a temperature that is below the melting temperature of both the first and second metals, thereby yielding an electrical contact. In some embodiments, a frictional force on a bottom surface of the rotatable shoulder causes heating of the first and second metals residing toward a distal end of the shoulder. In some embodiments, the first metal and the second metal are each in the form of at least one of a powder, chips, a solid bar, rod, metal scraps, or metal pellets. In some embodiments, relative amounts of the first and second metals are varied as the first and second metals build up on the material column to cause the material column to be a functionally graded material column. In some embodiments, the composition of the metal in the material feeder is changed at least once during the method. In some embodiments, at least one of the following is varied at least once during the method: a ratio of a volume or weight of the first metal to a volume or weight of the second metal, or a type of the first or second metal.

A third aspect of the disclosure provides a functionally graded, monolithic, electrical contact structure including a first metal and a second metal, characterized by a variation in composition in which a relative amount of the second metal as compared to amount of the first metal increases with distance in the structure from a first surface of the structure toward a second, opposing surface of the structure. In some embodiments, the first metal includes a soft metal that is a matrix metal selected from the group of copper, silver, aluminum, gold, platinum, or a combination thereof, and the second metal includes a hard metal selected from the group of chromium, chromium carbide, tungsten, tungsten carbide, molybdenum, molybdenum carbide, vanadium, vanadium carbide, aluminum oxide, or a combination thereof. In some embodiments, at least 50% of the height of the electrical contact structure includes from 65% to 100% by weight of the first metal, based on the total weight of both metals, and from 5% to 65% of the second metal, based on the total weight of both metals. In some embodiments, the electrical contact has a conductivity of from 25 to 50 MS/m.

These and other embodiments are described in greater detail in the detailed description which follows. An object of the presently disclosed subject matter having been stated hereinabove, and which is achieved in whole or in part by the presently disclosed subject matter, other objects will become evident as the description proceeds when taken in connection with the accompanying drawings as best described herein below.

DETAILED DESCRIPTION

The presently disclosed subject matter, which will now be described more fully, can be embodied in different forms and should not be construed as limited to the embodiments set forth herein. The following detailed description is exemplary in nature and is not intended to limit the scope, applicability, or configuration of the disclosure in any way. Rather, the following description provides some practical illustrations for implementing examples of the present disclosure. Examples of constructions, materials, dimensions, and manufacturing processes are provided for selected elements, and all other elements employ that which is known to those of ordinary skill in the field of the disclosure. It should be understood that the presently disclosed subject matter can be embodied in different forms and should not be construed as limited to the embodiments set forth herein. Those skilled in the art will recognize that many of the noted examples have a variety of suitable alternatives.

The electrical contact disclosed herein is suitable for use as a component of an electrical circuit. Such circuits can be used in a variety of devices, such as for example, electrical switches, relays, connectors and circuit breakers. The electrical contact has an electrical conductivity that makes it suitable for such use. In some embodiments, the electrical contact has an electrical conductivity of from 25 to 50 millisiemens per meter (mS/m).

Figure 1:
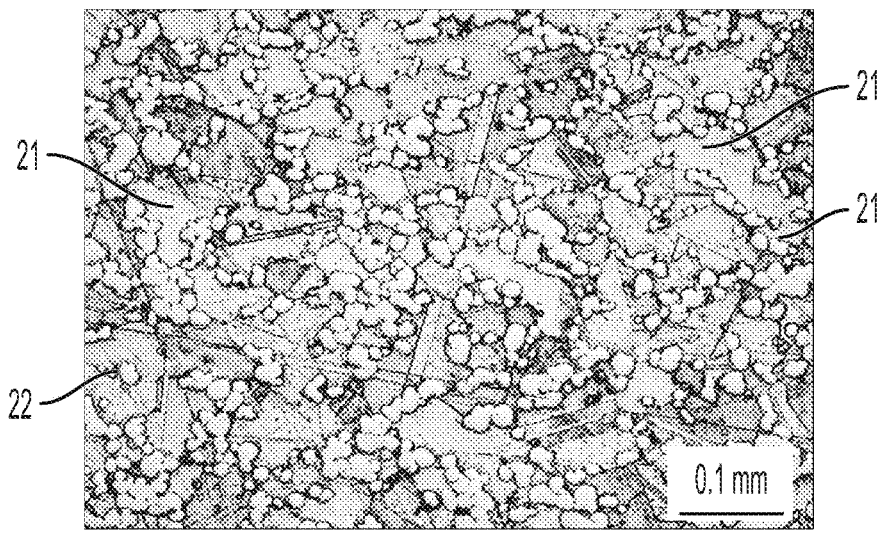
FIG. 1 illustrates a digital microscope camera image of a transverse cross section of a metal powder sintered electrical contact containing 75% copper and 25% chromium (etched, 100×).
Figure 2:
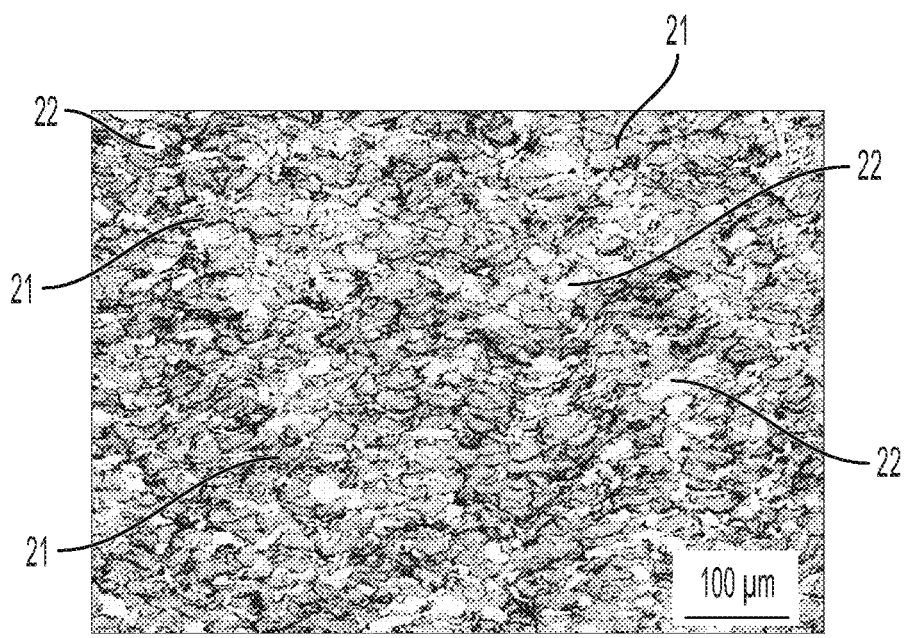
FIG. 2 illustrates a digital microscope camera image of a plan view (X,Y; 500×) of a cold-sprayed 75% copper and 25% chromium electrical contact.
Figure 3:
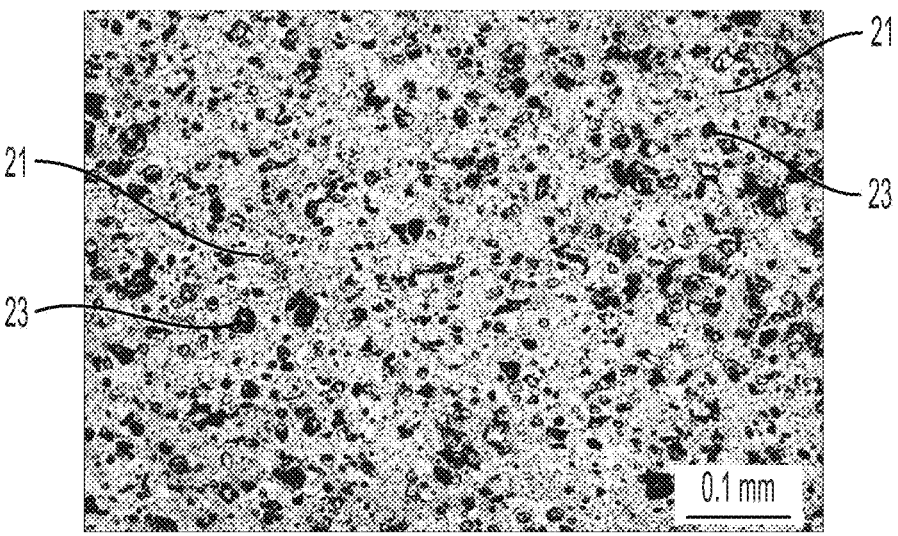
FIG. 3 illustrates a digital microscope camera image of a plan view (X,Y; 500×) of a cold-sprayed electrical contact containing copper and tungsten.

The electrical contact is made of a first and a second metal, each of which is present in a solid state. The first metal is an electrically conductive metal that provides electrical and thermal conductivity to the electrical contact, both of which are necessary for optimum flow of the current through the contact. In some embodiments, the first metal is the matrix metal, such as for example, copper, silver, aluminum, gold, platinum, or a combination thereof. The matrix metal herein has an electrical conductivity of at least 36 to 65 MS/m. The electrical contact also contains a second metal. The second metal includes one or more constituents that may be considered to be arc resistance particles. Examples of suitable particles include aluminum oxide, chromium, tungsten, molybdenum, vanadium, carbides such as for example, chromium carbide, molybdenum carbide, tungsten carbide, vanadium carbide, or a combination thereof. If the switch contacts interrupt the electrical current, this results in an arc that places a considerable load on the electrical contact. Disadvantageously the soft first metal lacks arc erosion resistance and mechanical strength, and also have a low weld resistance. The hard second metal provides heat resistance to the electrical contact, and increases the arc erosion resistance of the contact. Additionally, the hard second metal has a low welding tendency, thus it prevents the softer first metal parts from welding together. In some embodiments, the first metal includes a matrix metal selected from the group of copper, silver, aluminum, gold, platinum, or a combination thereof, and the second metal includes an arc resistant material selected from the group of chromium, chromium carbide, tungsten, tungsten carbide, molybdenum, molybdenum carbide, vanadium, vanadium carbide, aluminum oxide, or a combination thereof. In some embodiments, the first and second metals have substantially different melting temperatures. By "substantially different" is meant that the melting temperatures of the soft and hard metals differ by at least 1400° F. By way of example and without limitation, matrix materials that include the first metal may have melting points ranging from 1221° F. to 3218° F., while hard particles of the second metal may have melting points ranging from 3380° F. to 6152° F. The microstructure of the electrical contacts made according to the methods of the disclosure is similar to that of a metal powder sintered copper-chromium. For example, FIG. 1 shows a digital microscope camera image of a transverse cross section of a metal powder sintered electrical contact containing 75% copper 21 and 25% chromium 22 (etched, 100×). FIG. 2 shows a digital microscope camera image of a plan view (X,Y; 500×) of a 75% copper 21 and 25% chromium 22 electrical contact (75 Cu/25Cr) of FIG. 17 which was made by a cold spraying process according to a method of the disclosure. The chromium 21 particles appear to be about 30 to 70 micrometers in width. FIG. 3 shows a digital microscope camera image of a plan view (X,Y; 500×) of a cold-sprayed electrical contact containing copper 21 and tungsten 23.

Figure 4:
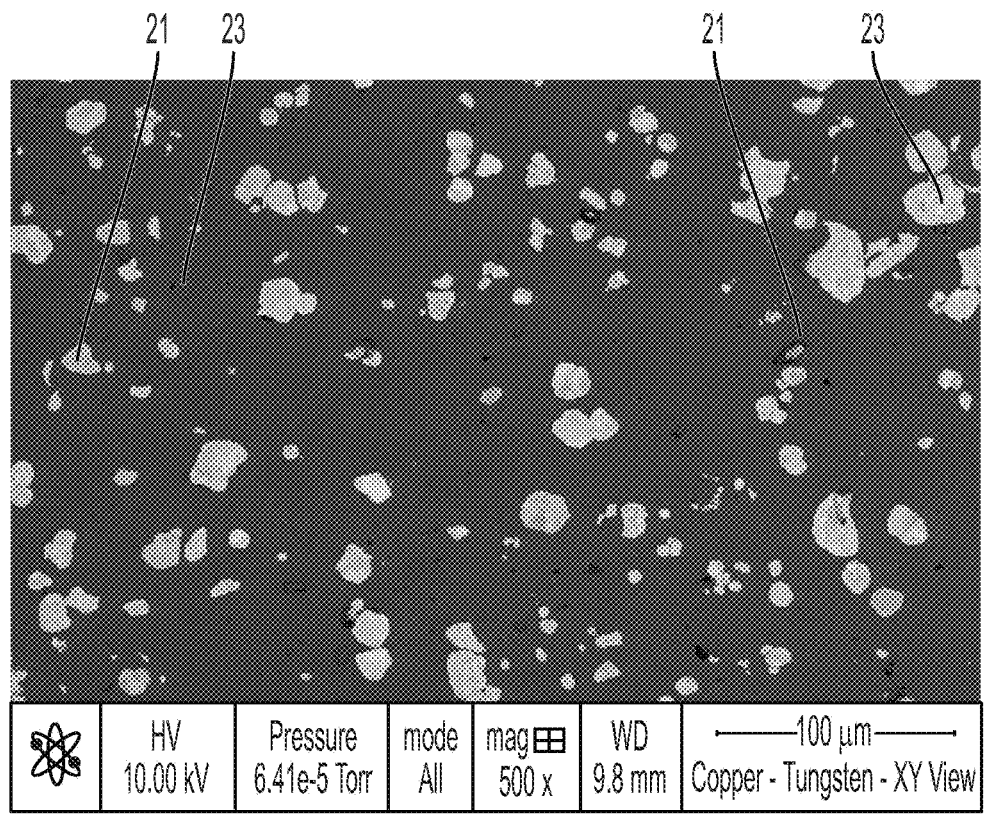
FIG. 4 illustrates a scanning electron microscope image (500×) showing the microstructure of an electrical contact containing copper and tungsten.
Figure 5:
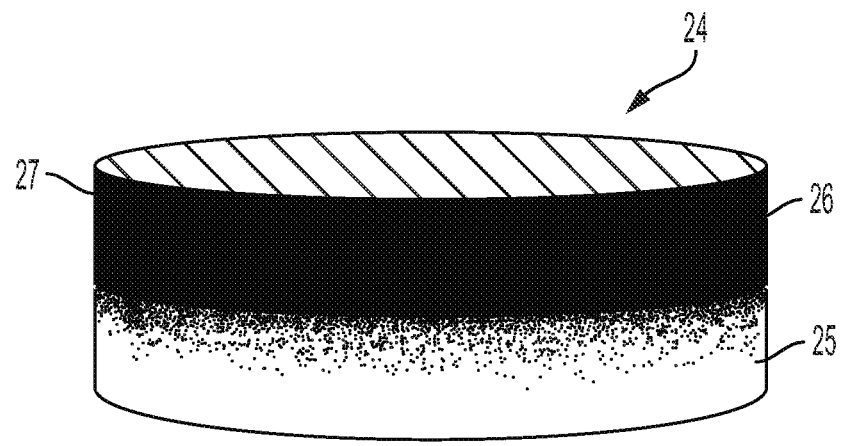
FIG. 5 illustrates a representation of a perspective view of an electrical contact having a functionally graded lower region containing copper and chromium, and a high work function material upper region.
Figure 6:
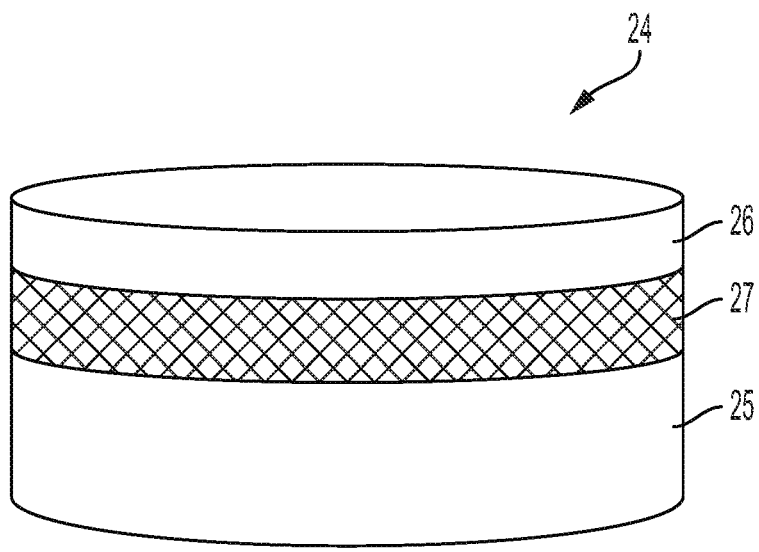
FIG. 6 illustrates a representation of a perspective view of an electrical contact including a layer of a high work function material.

The electrical contacts of the disclosure provide at least one of high mechanical strength, low gas content, arc erosion resistance, dissipation of short-circuit currents, and low welding tendency to the electrical contact. Electron emission is necessary to sustain an arc. In some embodiments, the second solid state metal is a high work function material. By "high work function material", is meant a material having a large amount of energy to remove an electron from the solid surface of the material. High work function materials advantageously make arcing difficult. In some embodiments, the high work function material gives a work function of from 4 to 5.5 electron volts (eV). It is desirable for the high work function material to have a high melting point. Examples of suitable high work function materials include nickel (which gives a work function of from 5.04 to 5.35 eV, and has a melting temperature of 2347° F.); tungsten (which gives a work function of from 4.22 to 5.32 eV, and has a melting temperature of 6150° F.); molybdenum (which gives a work function of from 4.36 to 4.85 eV, and has a melting temperature of 4750° F.), or any combination thereof. FIG. 4 shows a scanning electron microscope image (500×) showing the microstructure of an electrical contact containing copper 21 and a tungsten 23 high work function material. The tungsten 23 particles have a particle size of from 20 to 40 micrometers. In some embodiments, the high work function materials are used only in the top 30% to 80% of the height of the electrical contact. FIG. 5 shows a representation of an electrical contact 24 according to an embodiment, having a lower region 25 that is functionally graded and contains copper and chromium, and an upper region 26 that is a layer of a high work function material 27. As shown in FIG. 6, in some embodiments, the electrical contact includes a layer of a high work function material 27 that lies between an upper region 26 and a lower region 25 of the electrical contact, where the high work function material layer 27 forms an arc erosion barrier which prevents or diminishes melting and penetration of an arc into the electrical contact 24. The high work function material layer 27 has a high concentration of high work function material in a matrix of the first metal. In some embodiments, the high work function material layer 27 has a thickness of from about 0.5 mm to about 1.0 mm.

Figure 7:
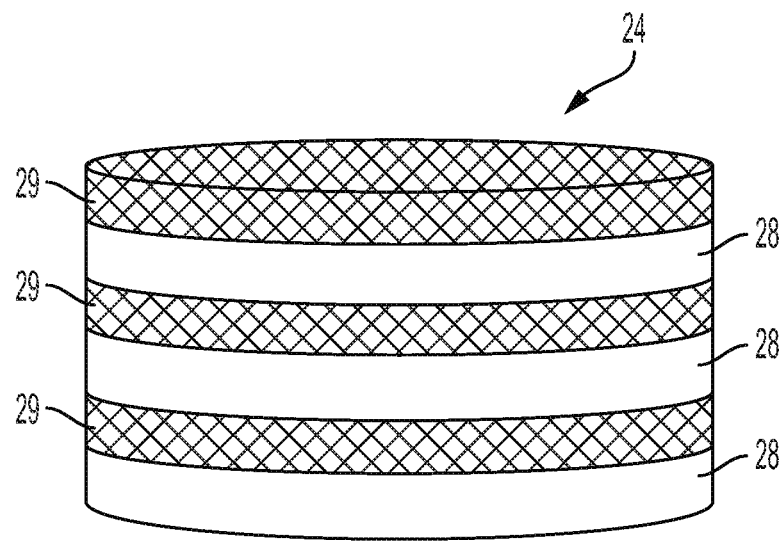
FIG. 7 illustrates a representation of a perspective view of an electrical contact having alternating regions of a first solid state metal and regions of both a first and a second solid state metal.

While it is advantageous to use hard metals in electrical contacts, this type of metal tends to be undesirably expensive. In order for the hard metal to impart the desired properties to the electrical contact, it is not necessary for the hard metal to be dispersed evenly within the entire body of the contact. For example, in some cases, the hard metal may only be needed in one quarter to one third of the height of the contact. Thus electrical contacts that incorporate the hard metal throughout the contact unnecessarily contain an excess of the hard metal, which is a waste of money and material. In some embodiments, the disclosed electrical contact contains a variation in composition within the height of the electrical contact, which advantageously overcomes the abovementioned financial and material waste. Thus, the relative amounts of the first and second metals in the electrical contact vary at different heights within the electrical contact. In some embodiments, the relative amounts of the first and second metals vary gradually within the height of the electrical contact. In some embodiments, the electrical contact includes at least two layers, where at least two of the layers have a different relative amount of the first and second metals, and at least one second layer is disposed on top of at least one first layer. In some embodiments, the electrical contact includes a plurality of layers, where at least two of the layers contain a different relative amount of the first and second metals. The amount of the first or second metal in each of the layers can vary from 0 to 100 weight percent, based on the total weight of the electrical contact. FIG. 7 shows a representation of an electrical contact 24 according to an embodiment, having alternating layers of the first metal 28 and of both the first and second metals 29.

Figure 8:
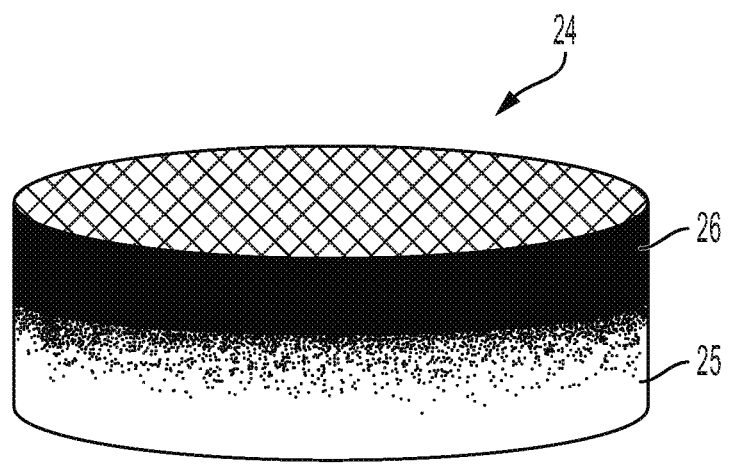
FIG. 8 illustrates a representation of a perspective view of a functionally graded electrical contact that has been made by a cold spray process.

In some embodiments, the amount of the second metal in the electrical contact is higher toward one surface of the contact than it is toward the opposing surface of the contact. For example, in some embodiments, the electrical contact is a functionally graded, monolithic structure. By "functionally graded" is meant that the electrical contact is characterized by a variation in composition gradually through the height of the contact, resulting in corresponding changes in the properties at different contact heights. By "monolithic" is meant constituting a single unit. The relative amount of the hard second metal, as compared to amount of the first metal, increases with distance in the structure from a first surface of the structure toward a second, opposing surface of the structure. For example, FIG. 8 shows a representation of a functionally graded electrical contact 24 that has been made according to a method of an embodiment of the disclosure, by a cold spray process. The electrical contact contains both copper and chromium, with a low chromium content in the lower region 25 of the electrical contact 24. The chromium content increases continuously or incrementally throughout the height of the electrical contact 24, so that the upper region 26 of the electrical contact 24 has a higher chromium content that the lower region 25. In some embodiments, at least 50% of the height of the electrical contact structure contains from 65% to 100% of the first metal, based on the total weight of the solid state metals, and from 0% to 35% of the second metal, based on the total weight of both solid state metals. In some embodiments, at least 33% of the height of the electrical contact structure contains from 65% to 100% of the first metal, based on the total weight of both metals, and from 0% to 35% of the second metal, based on the total weight of both metals. In some embodiments, at least 25% of the height of the electrical contact structure contains from 65% to 100% of the first metal, based on the total weight of both metals, and from 0% to 35% of the second metal, based on the total weight of both metals.

The electrical contacts of the disclosure can be made by any suitable method. It was unexpectedly discovered that additive manufacturing can be used to make the disclosed electrical contacts. Additive manufacturing methods can control the distribution of the first and second solid state metals within the multi-material electrical contact. The additive manufacturing methods provide at least one advantage over conventional metal powder sintering methods, including at least one of reduced cost, increased arc erosion resistance or increased conductivity. Additionally, additive manufacturing methods offer electrical contact design flexibility, enabling for example, gradient designs, stacked compositions and multiple layer designs. A further advantage of additive manufacturing is that in some embodiments, it enables the deposition of the first and second metals, or other particles, in geometric patterns within a particular zone, or throughout the height of the contact, or both.

In some embodiments, the electrical contacts are made by operating at least one material feeder to release a feed of a first solid state metal in powder form, and a second solid state metal, also in powder form. The first and second metal powders are deposited on a substrate by applying a compressed gas to the metals. This causes the metal powders to be ejected toward the substrate, and to be deposited on the substrate under a pressure sufficient for a bond to form between the metals. The deposited metals accumulate on the substrate, yielding a material column which is maintained at a temperature that is below the melting temperature of both the first and second metals. Once sufficient metal has been deposited on the substrate, the deposition is discontinued, yielding an electrical contact.

In some embodiments, the electrical contacts are made by a cold spray additive manufacturing process. Cold spray processes occur by driving a stream of powder particles against a substrate. Any suitable substrate, such as for example a metal substrate, can be used. Driven by a high temperature and high-pressure gas, the powder particles obtain very high velocities. The temperature of the powder particles remains below the melting temperature of the powder particles. Upon impact with the substrate, the powder particles deform, creating a bond between the particles. The solid metal particles build up on the substrate, forming a material column. When the desired contact height and shape are obtained, the deposition is discontinued, yielding an electrical contact.

The cold spray manufacturing device includes at least one material feeder. The material feeder, can have any suitable size or configuration. In some embodiments, the cold spray device contains a single material feeder. The material feeder contains a powder form of a first metal, a second metal, or both. The first and second metals can have any suitable size. In some embodiments, the first and second metals have a particle size of from 5 microns to 120 microns. The material feeder is capable of being operated to release a feed of at least one of a first metal or a second solid state metal. A compressed gas is applied to the released metals, causing the metals to be ejected at a high velocity toward a substrate, where they are then deposited. The first and second metals can be ejected onto the substrate at any suitable angle. Too high of a deposition angle undesirably results in an increase in the number of disband defects. In some embodiments, the first and second meals can be ejected onto the substrate at an angle of from 75° to 105°. Any suitable compressed gas can be used. In some embodiments, the compressed gas is a primary gas, such as for example, helium, nitrogen, compressed air, hydrogen, or a combination thereof. The force of the compressed gas causes the metals to be deposited under a pressure that is sufficiently high for a bond to form between the deposited metal powder particles. As the metals continue to be deposited on the substrate, they begin to accumulate, yielding a material column. During deposition, the metals in the material column remain in a solid state at a temperature that is below the melting temperature of both the first and second metals. The deposition is continued until the material column has reached the desired height, yielding an electrical contact.

In some embodiments, the cold spray manufacturing device is used to create a material column that is a functionally graded column. The functional grading is created by varying the relative amount of the first and second solid state metals deposited on the substrate, over time. This results in the formation of a material column that is characterized by a variation in composition gradually or incrementally through the height of the column, resulting in corresponding changes in the properties at different height of the column. For example, several layers of 75% first metal/25% second metal (e.g. 75Cu/25Cr) can be deposited onto a substrate, after which the composition ratio can be switched to a higher first metal content, for example 95% first metal/5% second metal (e.g. 95Cu/5Cr). As the material column nears the desired electrical contact height, the composition can be shifted back to 75% first metal/25% second metal (e.g. 75Cu/25Cr). This provides a functionally graded electrical contact having outer portions that provide high conductivity and arc erosion resistance, and anti-welding, and a middle portion that provides high conductivity. FIG. 8 shows a representation of a functionally graded electrical contact 24 that has been made by a cold spray process, and contains both copper and chromium, with a low chromium content in the lower region 25 of the electrical contact 24. The chromium content increases continuously or incrementally throughout the height of the electrical contact 24, so that the upper region 26 of the electrical contact 24 has a higher chromium content that the lower region 25.

In some embodiments, the functionally graded electrical contact can be provided by depositing the first and second metals on the surface of a metal core, such as for example a wrought copper core.

Figure 9:
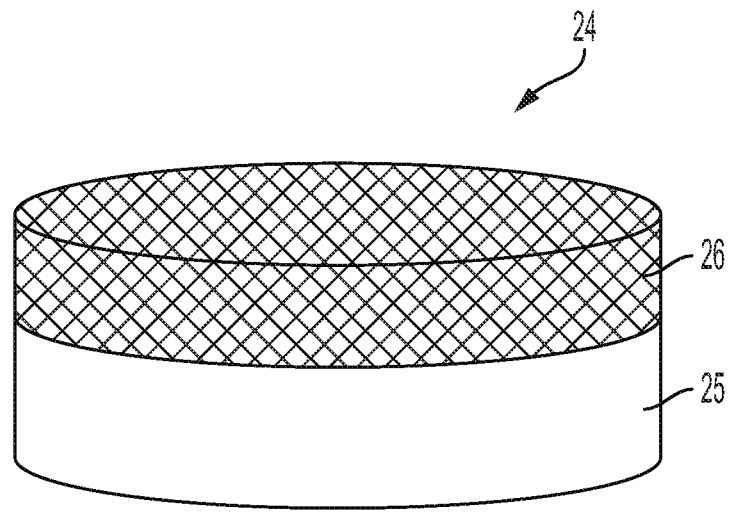
FIG. 9 illustrates a representation of a perspective view of an electrical contact that was made by a cold spray method, and has an upper region containing copper and chromium, and a lower region containing copper.

The amount of first and second metals being deposited on the substrate at any given time can be controlled by any suitable method, for example, by adjusting the number of material feeders, or the contents of the at least one material feeder. In some embodiments, the cold spray manufacturing device has a single material feeder. The contents of the single material feeder can be changed over time. At any time, the material feeder can contain only the first metal, only the second metal, or both the first and second metals. The relative amount of the combined first and second metal placed in the same material feeder can be kept constant, or varied over time. In some embodiments, cold spray additive is used to make an electrical contact containing approximately 75% by weight of the first metal, and approximately 25% by weight of the second metal. For example, the electrical contact can contain 75% by weight copper and 25% by weight chromium. The chromium and copper can be blended together as a fixed composition (75% Cu/25% Cr) mixture fed through a single powder feeder. In some embodiments, the cold spray manufacturing device has a first material feeder, a second material feeder, and optionally additional feeders. The first material feeder contains the first metal, and it can be operated to release a feed of the first metal. The second material feeder contains the second metal, and it can be operated to release a feed of the second metal. When the first and second metals are released into the compressed gas, the first and second metals become mixed as they are being ejected onto the substrate. The relative amount of the first and second metals being released from the material feeders at any point in time can be controlled, for example manually, or by a computer. In some embodiments, the cold spray manufacturing device has at least two material feeders, and at least one of the material feeders contains both first and second metals. In those embodiments utilizing multiple material feeders, the relative amount of the first and second metals being released from each material feeder at any point in time can be controlled, for example manually, or by a computer program. This enables the cold spray method to be used to quickly switch the electrical contact size, design, composition ratio or constituents simply by changing a computer program. For example, with three or more programmable powder feeders it is possible to quickly switch compositions, for example from Copper-Chromium to Copper Chromium Carbide, to Copper-Tungsten or to other materials. FIG. 9 shows a representation of a stacked electrical contact 24 that was made by a cold spray method, having an upper region 26 that is made of copper and chromium (for example 75% Cu/25% Cr), and a lower region 25 that is made of only copper, such as for example a C10100 alloy.

In some embodiments, the solid state metals released from the at least one material feeder are ejected toward the substrate through a cold spray system nozzle. Any suitable nozzle can be used, such as for example a de Laval nozzle. The nozzle may be located at any suitable location on the cold spray additive manufacturing device. The location of the at least one material feeder relative to the nozzle impacts the pressure under which the released first and second metals are ejected toward the substrate. Thus, the pressure under which the released first and second metals are ejected toward the substrate can be controlled by the selection of the location of the at least one material feeder on the cold spray manufacturing device. In some embodiments, the at least one material feeder is located upstream of the nozzle. In general, release of the metals upstream of the nozzle enables the ejection of the metals at very high velocities, taking full advantage of the velocity achievable by a cold spray system. In some embodiments, the metals are ejected onto the substrate at a very high velocity of from 800 to 1000 m/second. In some embodiments, the at least one material feeder is located at the nozzle, so that the material feeder contents are released directly into the nozzle. In general, release of the metals into the nozzle results in a lower velocity of the ejected metals than would be the case in systems where the metals are released upstream of the nozzle. In some embodiments, the metals are ejected onto the substrate at a high velocity of from 500 to 800 m/second. In some embodiments, the metals are released into the cold spray system downstream of the nozzle. In general, release of the metals downstream nozzle results in an even lower velocity of the ejected metals than in systems where the metals are released upstream of the nozzle or directly into the nozzle.

The cold spray nozzle can be maneuvered to produce metal contacts having particular configurations. For example, in some embodiments, A robot or Computer Numerical Control (CNC) system can be programmed to sweep the nozzle through a programmed pattern that can reproducibly build electrical contacts having specific sizes, dimensions, configurations or designs.

Figure 10:
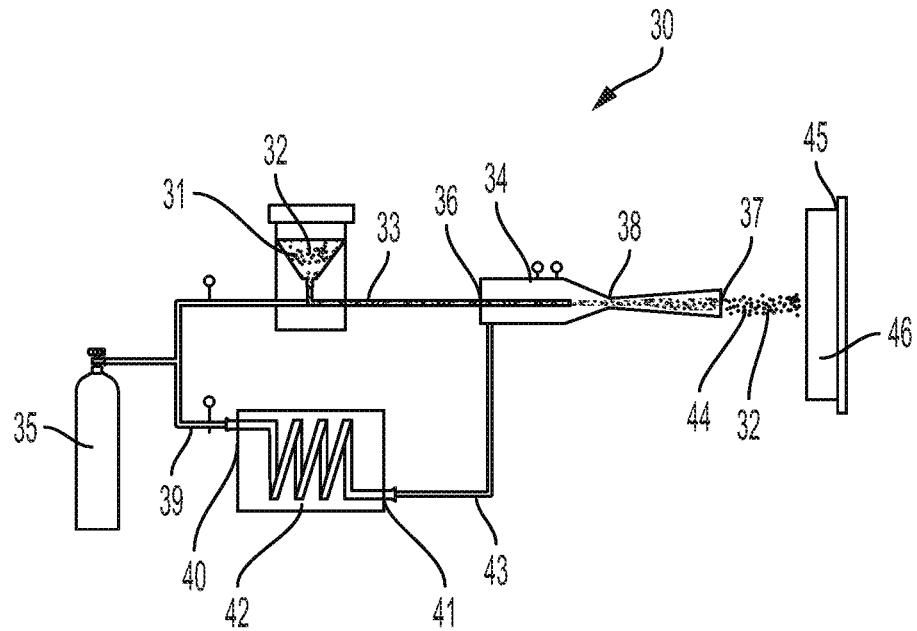
FIG. 10 illustrates a schematic representation of a high pressure cold spray system for making an electrical contact.
Figure 11:
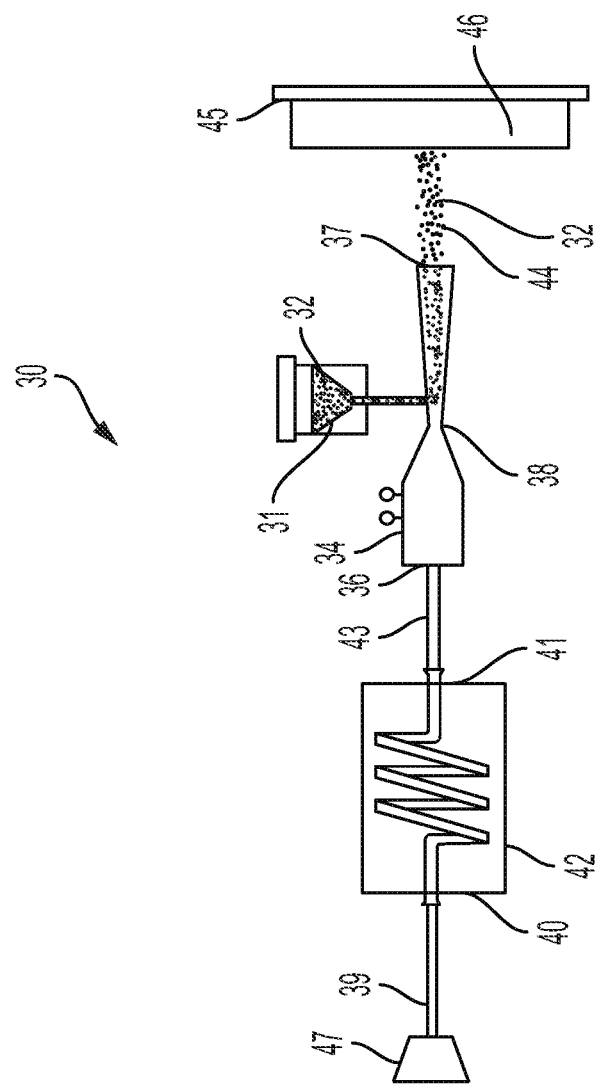
FIG. 11 illustrates a schematic representation of a low pressure cold spray system for making an electrical contact.

FIGS. 10 and 11 illustrate example embodiments of cold spray additive manufacturing devices making electrical contacts. It should be understood that the presently disclosed subject matter can be embodied in different forms and should not be construed as limited to the embodiments set forth herein. As shown in FIG. 10, in some embodiments, the electrical contact is made using a cold spray device 30 that is a high pressure system, such as for example a VRC Gen III™ High Pressure Cold Spray System (manufactured by VRC Metal Systems, LLC located in Box Elder, SD, USA). The cold spray device 30 has a material feeder 31 containing a mixture of first and second metals 32 in a powder form. The material feeder 31 is operated to release the first and second metals 32 into a feed line 33 which is located upstream of a de Laval constricting divergent nozzle 34. A compressed gas vessel 35 releases a compressed gas into the feed line 33, where it ejects the released first and second metals 32 into the proximal end 36 of the nozzle 34. The compressed gas, such as for example, helium or nitrogen, is capable of releasing the solid metal powder at very high velocities, such as for example from 800 to 1000 m/second. The compressed gas vessel 35 also releases the compressed gas into a heating line 39 leading to the proximal end 40 of a gas heater 42. The temperature of the compressed gas rises as the gas passes through the heater 42. The gas exiting the distal end 41 of the gas heater 42 has a temperature that is below the melting temperature of the first and second metals 32. The heated compressed gas exits the distal end 41 of the heater 42 through a heated gas feed line 43 which leads to the proximal end 36 of the nozzle 34. The heated compressed gas causes the temperature of the metals 32 entering the nozzle 34 to rise to a temperature that is below the first and second metal melting temperatures. The metals 32 remain in a solid state as they pass through the throat 38 of the nozzle 34, and a stream 44 of the metals 32 is ejected at a very high velocity onto the surface of a substrate 45, where they accumulate, forming a material column 46 that grows to become an electrical contact.

As shown in FIG. 11, in some embodiments, the electrical contact is made using a cold spray device 30 that is a low pressure cold spray system, such as for example a Centerline SST™ machine (manufactured by Centerline LTD located in Ontario, Canada). The cold spray system 30 has a material feeder 31 containing a powder that is a mixture of first and second metals 32. The material feeder 31 is operated to release the first and second metals 32 into a de Laval constricting divergent nozzle 34, downstream of the nozzle throat. A compressor 47 releases a compressed gas, such as for example compressed air, into a heating line 39 leading to the proximal end 40 of a gas heater 42. The temperature of the compressed gas rises as the gas passes through the heater 42. The gas exiting the distal end 41 of the gas heater 42 has a temperature that is below the melting temperature of the first and second solid state metals 32. The heated compressed gas exits the distal end 41 of the heater 42 through the heated gas feed line 43 which leads to the proximal end 36 of the nozzle 34. The heated gas passes through the throat 38 of the nozzle 34, and encounters the released metals 32, causing the temperature of the metals 32 in the nozzle 34 to rise to a temperature that is below the first and second solid state metal melting temperatures and thus remain in a solid state. The heated gas causes a stream 44 of the solid state metals 32 to be ejected from the distal end 37 of the nozzle 34, at a high velocity of from 500 to 800 meters/second, onto the surface of the substrate 45, where the solid state metals accumulate, forming a material column 46 that grows to become an electrical contact. Due to the location of release of the solid state metals 32 downstream of the nozzle throat 38, the solid state metals 32 do not attain the full velocity capability of the cold spray system 30. Thus in this embodiment, the velocity of the ejected metals 32 is lower than the velocity of achievable where the metals are fed upstream of the nozzle 34.

In some cases, cold spraying very hard materials, such as the second metals, suffers from the disadvantage of insufficient retention of the hard particles in the material column, as the hard particles tend to ricochet off the substrate. To compensate for inadequate retention, in some embodiments, the quantity of second metals deposited on the substrate is increased to get the desired final proportion in the electrical contact. For example, in a 75/25 copper-chromium mixture, to get 25 percent chromium in the deposit, the amount of chromium deposited can be increased to, for example 40 percent. Where a single material feeder can be used, the composition of the starting mixture can have a higher second metal content to achieve the desired second solid state metal content in the material column. Where more than one material feeder is being used, the material feeder can be programmed to adjust the feed ratio of the first and second metals to obtain the desired second metal content in the material column. In some embodiments, the second metal retention issues can be addressed by using second solid state metal particles that are clad or electroplated with a soft exterior metal. For example, a copper-clad tungsten powder can be used.

Advantageously, the time required to make electrical contacts using a cold spray method is significantly shorter than the time needed for conventional metal powder sintering methods. In some embodiments, the electrical contact is formed by cold spray additive manufacturing within a period of time of between 2 minutes and 25 minutes.

A further significant advantage of cold spray in multiple-material additive manufacturing is that there is no melting of the powder particles or the substrate. Joining of the cold sprayed materials is accomplished in the solid state, with the powder particles forming solid state bonds on impact with the substrate. When a two-material system is selected, like the first and second metals (for example copper and chromium), and when these two materials are largely immiscible, fusion welding these materials is extremely difficult. The materials segregate in the molten weld puddle. This often leads to cracking. The difference in melting temperatures of the two materials also causes difficulty for a welding process. Accordingly, Direct Energy Deposition (DED) laser cladding and Laser Powder Bed Fusion are poor choices for immiscible materials with vastly different melting temperatures. Cold spray, on the other hand, performs well in depositing vastly dissimilar materials.

In some embodiments, the electrical contacts are made by a friction stir additive manufacturing process. Friction stir processes use frictional forces caused by a rotating tool to soften and join metals together by a strong solid state bond, with no melting. The rotating tool deposits the joined metals onto a substrate. Any suitable substrate, such as for example a metal substrate, can be used.

Figure 12:
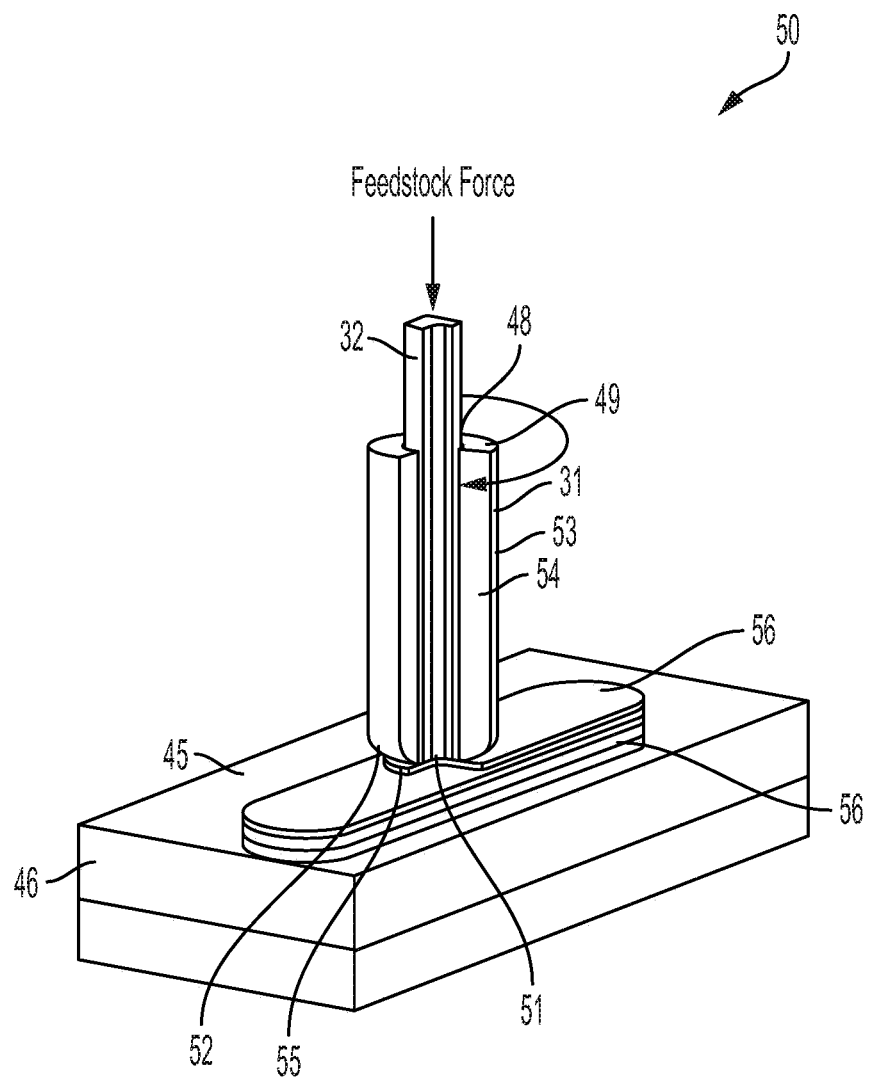
FIG. 12 illustrates a representation of a perspective view of a friction stir additive system for making an electrical contact.

FIG. 12 illustrates an example embodiment of an electrical contact being formed by a friction stir additive device. It should be understood that the presently disclosed subject matter can be embodied in different forms and should not be construed as limited to the embodiments set forth herein. As shown in FIG. 12, in this embodiment, the friction stir additive device 50 is a rotating tool that includes a material feeder 31 having an entry point 48 at its proximal end 49 and an exit 51 at its 52 distal end. The material feeder 31 includes a hollow rotatable shoulder 53 that defines a receiver 54, which is configured to receive the first and second metals 32. The material feeder 31 is operated to release a feed 55 of first and second metals 32 in a solid state from the exit 51 of the material feeder 31, onto the surface of a substrate 45. The operation of the material feeder 31 includes applying a pressure to the first and second materials 32 residing in the receiver 54, at the proximal end 49 of the material feeder 31, while the shoulder 53, which is rotating around the first and second solid state metals 32 in the receiver 54, is forced against the surface of the substrate 45, causing the substrate 45 to become frictionally heated to its forging temperature. The heated substrate 45 causes the first and second solid state metals 32 located in the vicinity of the distal end 52 of the material feeder 31 to be thermally softened, while the metals 32 maintain a temperature that is below the melting temperatures of each of the first and second metals and thus remain in solid state. The material feeder 31 is plunged lightly into the thermally softened solid state metals 32, and advanced along a path, depositing a layer 56 of the softened solid state metals 32. Multiple passes of the material feeder 31 along the path are performed to deposit additional layers 56 of the softened solid state metal 32, causing the formation of a material column 46.

The process causes the formation of a solid state bond between the released metals 32. The melting temperature of the material column 46 is maintained below the melting temperature of the metals 32. The deposition is continued until the desired material column 46 height has been achieved, yielding an electrical contact. The friction stir additive process thus enables joining of the metals with no melting. The lack of melting is advantageous as there is an opportunity for the first and second metals to go into solution and then re-precipitate. Conventional methods, such as laser cladding, disadvantageously use melting, which is susceptible to dramatic changes in particle size, porosity, and cracking. Friction stir additive manufacturing enables the production of electrical contacts that do not suffer from at least one of these problems.

The first and second metals may be in any suitable form that is able to fit into the friction stir additive device receiver. In some embodiments, at least one of the first or second metals is in the form of a powder, chips, wire, a solid bar, rod, metal scraps, or metal pellets. The first solid state metal and the second solid state metal may be in the same or a different form. In some embodiments, either the first or the second metal is in the form of a powder. In some embodiments, a filler metal is fed into the friction stir additive device receiver along with the first and second metals. Any suitable filler metal can be used, aluminum oxide, chromium, tungsten, molybdenum, vanadium, carbides such as for example, chromium carbide, molybdenum carbide, tungsten carbide, vanadium carbide, or a combination thereof.

Figure 13:
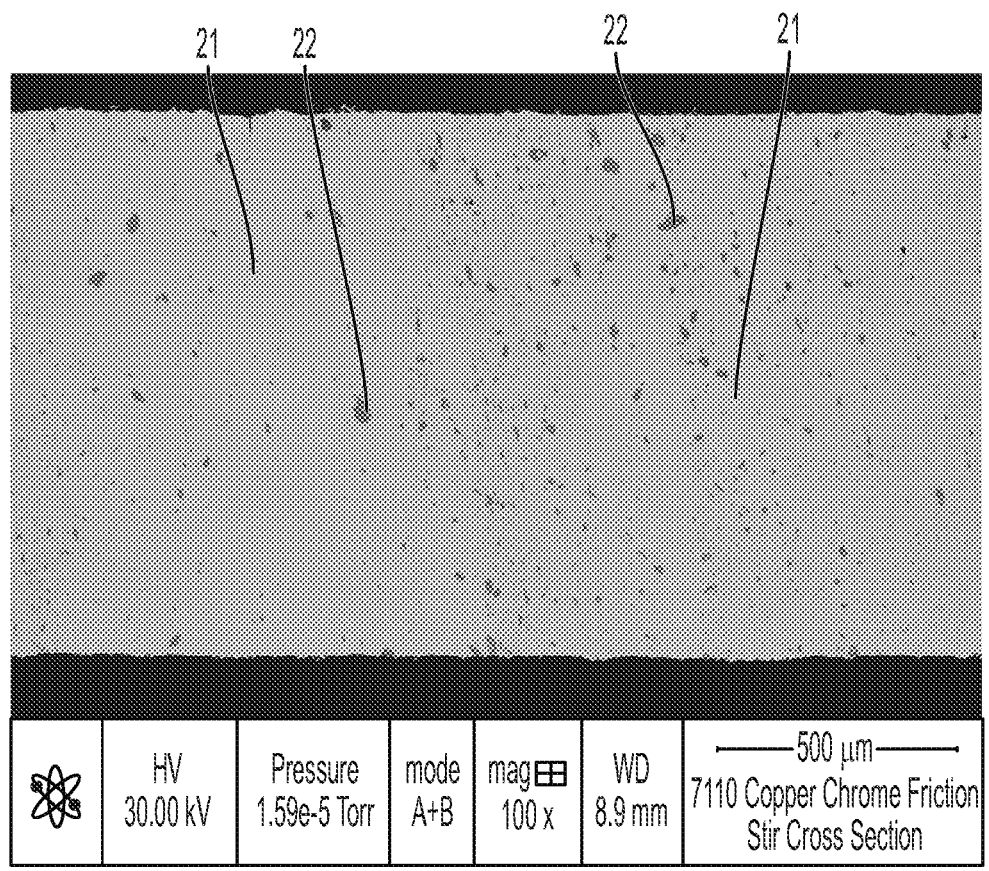
FIG. 13 illustrates a scanning electron microscope image (100×) of a transverse section of an electrical contact disc that was made by a friction stir additive process, and that contains copper and chromium.

The amount of first and second metals being deposited on the substrate at any given time can be controlled by any suitable method, for example, by adjusting the contents of the material feeder or by using more than one material feeder. In some embodiments, the friction stir additive device has a single feeder. The contents of the single material feeder can be changed over time. At any time, the material feeder can contain only the first metal, only the second metal, or both the first and second metal. The relative amount of the combined first and second metals placed in the same material feeder can be kept constant, or varied over time. In some embodiments, the friction stir additive device is used to make an electrical contact containing approximately 75% by weight of the first metal, and approximately 25% by weight of the second metal. For example, the electrical contact can contain 75% by weight of copper, and 25% by weight chromium. The chromium and copper can be blended together as a fixed composition (75% Cu/25% Cr) mixture fed through a material feeder. In some embodiments, the cold spray manufacturing device has a first material feeder, a second material feeder, and optionally additional feeders. The first material feeder contains the first metal, and it can be operated to release a feed of the first metal. The second material feeder contains the second metal, and it can be operated to release a feed of the second metal. The relative amount of the first and second metals being released from the material feeders at any point in time can be controlled, for example manually, or by a computer. In some embodiments, the friction stir additive device has at least two material feeders, and at least one of the material feeders contains both first and second metals. In those embodiments utilizing multiple material feeders, the relative amount of the first and second metals being released from each material feeder at any point in time can be controlled, for example manually, or by a computer program. This enables the friction stir method to be used to quickly switch the electrical contact size, design, composition ratio or constituents simply by changing a computer program. For example, with three or more programmable powder feeders it is possible to quickly switch compositions, for example from Copper-Chromium to Copper-Chromium Carbide, to Copper-Tungsten or to other materials. FIG. 13 shows a scanning electron microscope image (100×) of a transverse section of an electrical contact disc containing copper 21 and chromium 22 that was made by a friction stir additive process.

In some embodiments, the friction stir additive device is used to create a material column that is a functionally graded column. The functional grading is created by varying the relative amount of the first and second solid state metals deposited on the substrate, over time. This results in the formation of a material column that is characterized by a variation in composition gradually or incrementally through the height of the column, resulting in corresponding changes in the properties at different heights of the column. For example, several layers of 75% first solid state metal/25% second solid state metal (e.g. 75% Cu/25% Cr) can be deposited onto a substrate, after which the composition ratio can be switched to a higher first solid state metal content, for example 95% first solid state metal/5% second solid state metal (e.g. 95% Cu/5% Cr). As the material column nears the desired electrical contact height, the composition can be shifted back to 75% first solid state metal/25% second solid state metal (e.g. 75% Cu/25% Cr). This provides a functionally graded electrical contact having outer portions that provide high conductivity and arc erosion resistance, and anti-welding, and a middle portion that provides high conductivity.

Advantageously, the time required to make electrical contacts using a friction stir method is significantly shorter than the time needed for conventional metal powder sintering methods. In some embodiments, the electrical contact is formed by friction stir additive manufacturing within a period of time of less than one hour.

The friction stir additive method can be used to produce electrical contacts having particular configurations. For example, in some embodiments, a robot or Computer Numerical Control (CNC) system can be programmed to sweep the material feeder through a programmed pattern that can reproducibly build electrical contacts having specific sizes, dimensions, configurations or designs.

Figure 14:
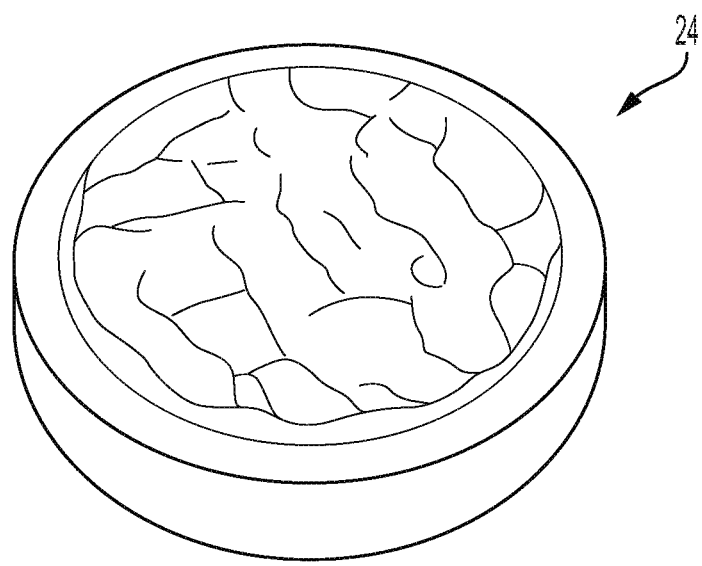
FIG. 14 illustrates a perspective view of an unfinished electrical contact formed by a cold spray process.
Figure 15:
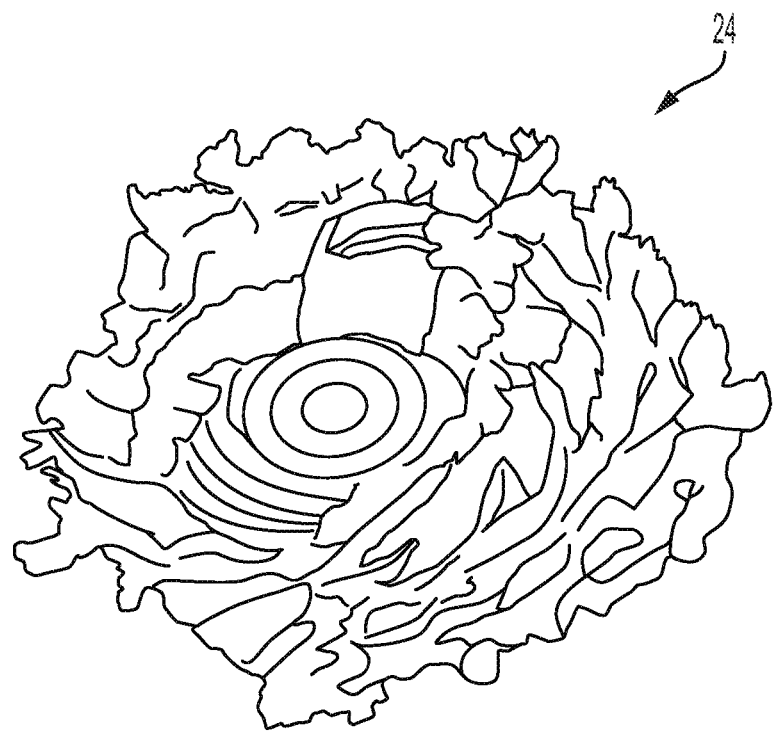
FIG. 15 illustrates a perspective view of an unfinished electrical contact formed by a friction stir process.
Figure 16:
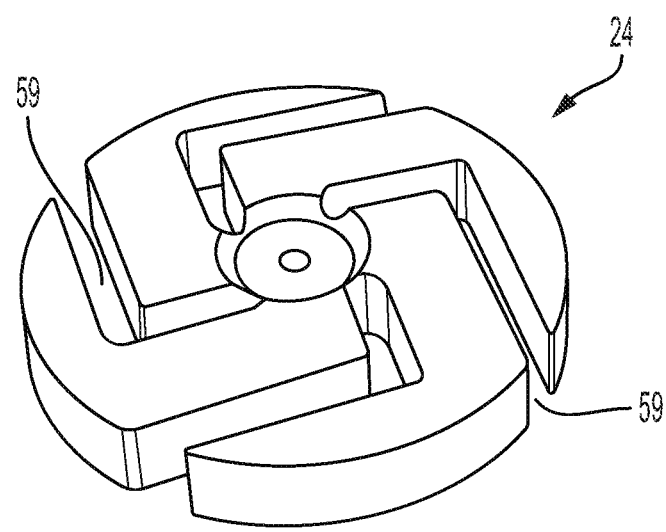
FIG. 16 illustrates a perspective view of an electrical contact that has been cut into a hooked cross pattern.
Figure 17:
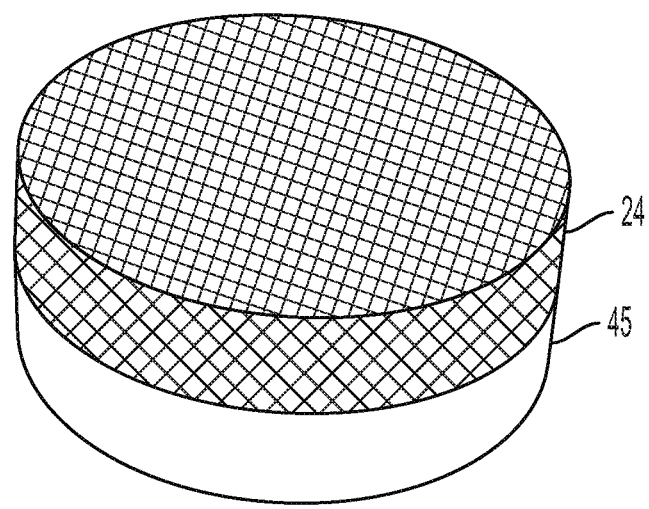
FIG. 17 illustrates a perspective view of a copper-chromium electrical contact that was water jet cut into a circular disk shape.

The disclosed methods enable the reproducible production of multiple electrical contacts having the same, or different properties, as various adjustments can be made at any time during the method of making the electrical contacts, enabling the creation of contacts having at least one of the desired composition, properties or shape. Thus, custom electrical contacts having specific properties can be easily and quickly accommodated. After creation by the methods of the disclosure, the electrical contacts can be finished or formed into a variety of shapes or designs. For example, FIG. 14 shows an unfinished electrical contact 24 formed by a cold spray method, and FIG. 15 shows an unfinished electrical contact 24 formed by a friction stir method. FIG. 16 shows a finished contact 24 that has been cut into a hooked cross pattern from the electrical contact of FIG. 14 or 15. Designs can be cut into electrical contacts by any suitable method such as for example, water jet cutting, laser, machining, or pressing. FIG. 17 shows a copper-chromium electrical contact 24 that was deposited in a rectangular shape using nitrogen gas on an aluminum substrate, and then water jet cut into a circular disk shape. The electrical contact rests on an aluminum substrate 45.

Figure 18:
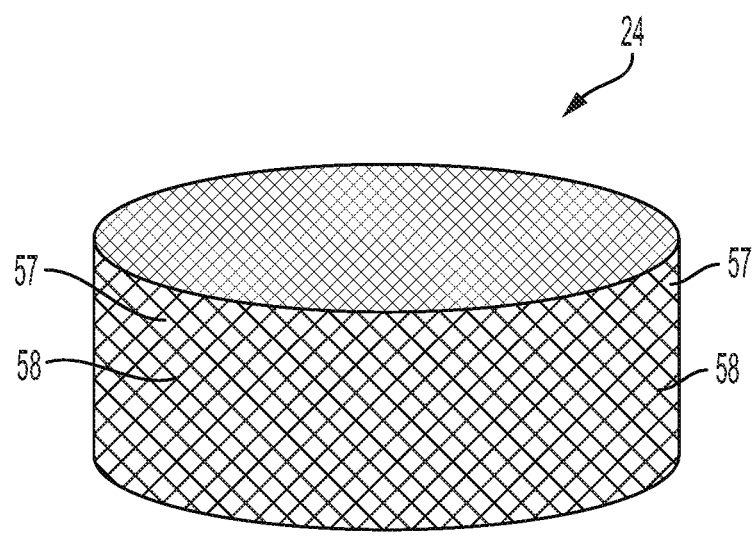
FIG. 18 illustrates a representation of a perspective view of an electrical contact having a second solid state metal arranged in a cross-hatch pattern in the contact.
Figure 19:
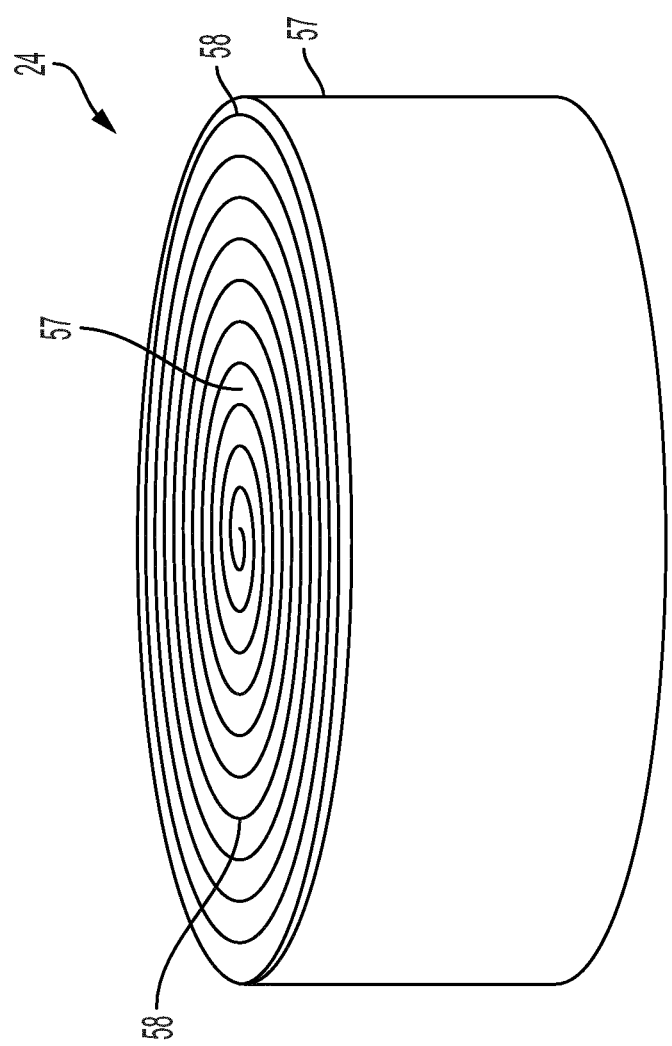
FIG. 19 illustrates a representation a perspective view of an electrical contact having a second solid state metal arranged in a spiral pattern in the contact.

In some embodiments of the disclosure, the second solid state metals can be distributed in the electrical contact in a pattern, such as for example a geometric pattern. The pattern can occur within a particular region of the electrical contact, or throughout the thickness of the contact, or both. For example, FIGS. 18 and 19 show representations of second solid state metals 58 arranged in a cross-hatch pattern and a spiral pattern, respectively, in a matrix of a first solid state metal 57, in an electrical contact 24. The path for the second solid state metals 58 is determined by the design of the specific electrical contact 24. For example, FIG. 16 shows a hooked cross patterned contact 24 with L-shaped slots 59 that were made by the disclosed methods. This design rotates the arc and forces it radially outward, in the direction of the slots.

Specific ratios of solid state metals can be deposited at specific areas of the electrical contact. In some embodiments, at least one of the following is varied at least once during the method: a ratio of a volume or weight of the first solid state metal to a volume or weight of second solid state metals; a ratio of average or mean particle size of the first solid state metal to average or mean particle size of the second solid state metal; or a type of the first solid state metal or of the second solid state metal. In some embodiments, the composition of the solid state metal in at least one of the material feeders is changed at least once during the method. These parameters can be controlled by any suitable method, for example manually or by a computer program.

While different embodiments of the electrical contacts and methods of making the electrical contacts are described, skilled artisans will understand that any of the features of one embodiment can be incorporated into the other embodiments. Any combination of the features or steps described in any of the embodiments can be included in electrical contacts and methods of making the electrical contacts, and are within the scope of the invention.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method of forming an electrical contact comprising a functionally graded monolithic structure, the method comprising:
    operating at least one material feeder to release a feed of a first metal selected from a group consisting of copper, silver, aluminum, gold, platinum, and combinations thereof, and a second metal selected from a group consisting of aluminum oxide, chromium, chromium carbide, tungsten, tungsten carbide, molybdenum, molybdenum carbide, vanadium, vanadium carbide, and combinations thereof,
    wherein the first and second metals are each in a solid state and a powder form, and the second metal has a higher melting temperature as compared to a melting temperature of the first metal, and
    wherein the melting temperatures of the first and second metals differ by at least 1400° F.;
    depositing the first metal and second metal on a substrate by applying a compressed gas to the first and second metals to eject the first and second metals toward the substrate,
    wherein the depositing is performed under a pressure sufficient to form a solid state bond between the first and second metals, and
    wherein the first and second metals are ejected onto the substrate at an angle between 75° to 105°; and
    forming an electrical contact comprising a functionally graded monolithic structure,
    wherein an amount of the second metal as compared to an amount of the first metal increases with distance in the structure from a first surface of the structure to a second opposing surface of the structure such that the second metal content increases continuously or incrementally throughout height of the electrical contact, while maintaining the structure at a temperature that is below the melting temperature of both the first and second metals, keeping the first and second metals in a solid state.

2. The method of claim 1, further comprising:
    combining the first and second metals by mixing; and
    placing the combined metals in the same material feeder.

3. The method of claim 1, wherein:
    the at least one material feeder comprises a first material feeder and a second material feeder;
    the first material feeder is operated to release the feed of the first metal, and the second material feeder is operated to release the feed of the second metal; and
    the first and second metals are mixed when the metals are ejected by applying the compressed gas.

4. The method of claim 1, wherein the compressed gas comprises a primary gas selected from the group consisting of helium, nitrogen, compressed air, hydrogen or combination thereof.

5. The method of claim 1, wherein the method is conducted in a cold spray additive manufacturing device.

6. The method of claim 5, wherein the released metals are ejected toward the substrate through a cold spray system nozzle.

7. The method of claim 6, wherein the at least one material feeder is located upstream of the cold spray system nozzle.

8. The method of claim 6, wherein the at least one material feeder releases at least one of the first or second metals into the cold spray system nozzle.

9. The method of claim 5, wherein the pressure under which the released first and second metals are ejected toward the substrate changes when the location of the at least one material feeder is changed.

10. The method of claim 1, wherein the first and second metals each have a particle size of from 5 microns to 120 microns.

11. The method of claim 1, wherein at least one of the following is varied during an operating step:
    a ratio of a volume or weight of the first metal to a volume or weight of the second metal; or
    a ratio of average or mean particle size of the powder of the first metal to average or mean particle size of the powder of the second metal.

12. The method of claim 1, wherein a composition of the metal in the at least one material feeder is changed during an operating step.

13. The method of claim 1, wherein a composition of the metal in the at least one material feeder is controlled by a computer program.

14. The method of claim 1, wherein the electrical contact is formed within a period of time of between 2 minutes and 25 minutes.

15. The method of claim 1, wherein the first metal has an electrical conductivity of at least 25 millisiemens per meter.

16. The method of claim 1, wherein:
    the first metal comprises a soft metal selected from the group consisting of: copper, silver, aluminum, gold, platinum, or a combination thereof, and
    the second metal has a constituent that is an arc resistance particle.

17. The method of claim 16, wherein the second metal comprises a hard metal selected from the group consisting of chromium, chromium carbide, tungsten, tungsten carbide, molybdenum, molybdenum carbide, vanadium, vanadium carbide, aluminum oxide, and a combination thereof.

* * * * *